United States Patent [19]

Canzek

[11] 4,456,343
[45] Jun. 26, 1984

[54] HIGH SPEED CATADIOPTRIC OBJECTIVE LENS SYSTEM

[76] Inventor: Ludvik Canzek, Quellmattstrasse 3, 5035 Unterentfelden, Switzerland

[21] Appl. No.: 308,798

[22] Filed: Oct. 5, 1981

[30] Foreign Application Priority Data

Oct. 17, 1980 [CH] Switzerland ............... 7753/80

[51] Int. Cl.³ .................................... G02B 17/08
[52] U.S. Cl. ........................................... 350/444
[58] Field of Search ................................ 350/444

[56] References Cited

U.S. PATENT DOCUMENTS

| | | | |
|---|---|---|---|
| 3,507,556 | 4/1970 | Shimizu | 350/444 |
| 3,700,310 | 10/1972 | Rayces | 350/444 |
| 3,711,184 | 1/1973 | Amon et al. | 350/444 |
| 3,926,505 | 12/1975 | Rayces | 350/444 |
| 4,188,091 | 2/1980 | Fujii | 350/444 |
| 4,342,503 | 8/1982 | Shafer | 350/444 X |

*Primary Examiner*—John K. Corbin
*Assistant Examiner*—Scott J. Sugarman
*Attorney, Agent, or Firm*—Werner W. Kleeman

[57] ABSTRACT

This invention provides a high speed catadioptric objective system of F/1.2. The lens system comprises, in accordance with the advance of the light rays, a front or first single lens, a main mirror lens, a counter mirror and possibly a field lens system. The counter mirror is mounted in front of the front lens in order to achieve a short overall length and a good correction of spherochromatic aberration. The counter mirror may serve as a focussing element or it may be fixedly mounted to the front lens. The present lens system is distinguished over similar prior art systems by its overall length, which has been reduced by 30 percent, sunshade included. The same type of glass is used for almost all lenses of five preferred embodiments in order to eliminate the secondary spectrum and to enable the objective to be used within a very broad spectral range. An almost perfect correction of aberrations has been achieved with only spherical element faces, thus the systems are suitable when maximum image quality and speed are required. They are useful also for low light level and IR spectral range applications.

5 Claims, 8 Drawing Figures f = 100

$\lambda_g$ = 436 nm
$\lambda_d$ = 588 nm
$\lambda_s$ = 852 nm f = 100

------ mer.
——— sag.

HIGH SPEED CATADIOPTRIC OBJECTIVE LENS SYSTEM

CROSS REFERENCE TO RELATED APPLICATION

This application is related to my copending U.S. application Ser. No. 967,973, filed Dec. 8, 1978 now U.S. Pat. No. 4,273,425 and Ser. No. 280,244, filed July 6, 1981, entitled "High Speed Catadioptric Lens System" now U.S. Pat. No. 4,398,809.

BACKGROUND OF THE INVENTION

1. Field of the invention

The present invention relates to an improved high speed catadioptric objective lens system with a front lens, a main mirror lens, a counter mirror and with or without a field lens system.

2. Description of the prior art

Heretofore known catadioptric objective lenses are subdivided into two fundamentally different classes of performance with different relative aperture ratio (speed). The objectives of the first mentioned class are the tele-lenses, used in photography. These have a speed of F/5 or less in contrast to the object of the present invention, which is high speed and belongs to the second mentioned class. An example of a tele-lens of the first class with a speed of F/7.4 is disclosed in U.S. Pat. No. 4,188,091. Because of its low speed this lens, when used for imaging, transmits 38 times less light than a high speed lens with a speed of at least F/1.2. Moreover, the aforesaid known lens has a divergent field lens system in contrast to objectives with a convergent field lens system.

An example of the class of high speed lenses is disclosed in Swiss Pat. No. 542,454 and by L. Čanžek: "Lichtstarkes katadioptrisches Objektiv", Optica Acta, No. 12, 1971 and No. 4, 1972. The focus of this system is situated within the objective, impeding general use.

Other high speed objectives with the focus placed outside of the lens system are disclosed in L. Čanžek: "Neue Richtung in der Entwicklung der katadioptrischen Objektive", Optica Acta, No. 2, 1979, and described in my co-pending U.S. application Ser. No. 967,973, filed Dec. 8, 1978 now U.S. Pat. No. 4,273,425. The known high speed objectives, however, have either a considerable length or they are characterized by rather large sphero-chromatic aberrations over a broad spectral range.

The sphero-chromatic aberrations, known also as sphero-chromatism, essentially impair the image quality. The effect of these aberrations is all the more harmful with objectives of large focal distance and when used within a broad spectral range.

It is known in the art (and can be verified from the hereinafter presented Table 1) that the overall length and sphero-chromatism of high speed objectives cannot be reduced at the same time, and this limit may not be overcome by known means.

The overall length essentially depends on the air separation $d_2$ between front lens and main mirror lens. Sphero-chromatism $\Delta s_{\lambda',d}$ for light wavelength $\lambda$ with reference to the fundamental spectral line d is given by $$\Delta s_{\lambda',d} = (s'_R - s'_o)_\lambda - (s'_R - s'_o)_d,$$

$s'_R$ being the back focal distance of the aperture limited ray and $s'_o$ the back focal distance of the paraxial ray.

A reduction of the aforesaid air separation $d_2$ would result in a shorter, lighter and above all in a more handy objective. This would result in a significant progress over the state of the art in view of the fact that overall length is proportional to the focal length and that objectives of this kind are built generally with a great focal length.

As mentioned above, nevertheless, a reduction in overall length up to now has meant poor spherochromatism, thus limiting or even excluding use of such objectives within a broad spectral range or respectively excluding their construction with great focal length.

SUMMARY OF THE PRESENT INVENTION

An important object of the present invention is to therefore provide a high speed catadioptric objective lens with reduced distance between front lens and main mirror lens in relation to known systems with approximately equal sphero-chromatism and equal characteristics of performance.

The optical system of this invention comprises, in accordance with the advance of the light rays, a front lens, a main mirror lens, a counter mirror and optionally a field lens system. The counter mirror is mounted with its reflecting face on the object side in front of the front lens. The counter mirror is constructed as a reflecting lens and the field lens system is convergent.

BRIEF DESCRIPTION OF THE DRAWINGS

The invention will be better understood and objects other than those set forth above, will become apparent when consideration is given to the following detailed description thereof. Such description makes reference to the annexed drawings wherein.

DESCRIPTION OF THE PREFERRED EMBODIMENTS

Figure 1:
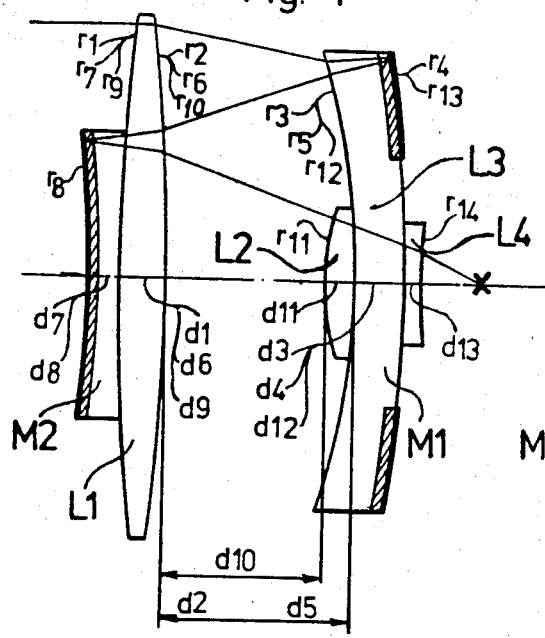
FIGS. 1-6 respectively illustrate schematic cross sections of preferred embodiments of the present invention.

Examples 1 to 5 are shown in the following tables and will be described with reference to FIGS. 1-5. F is the speed of the lens system, f is the focal length, s' is the back focal distance, $n_d$ is the retractive index and $v_d$ is the Abbe's number of the related lens.

EXAMPLE 1

| | Face No. | F/1.2 f= 99.861 s' = 6.785 | | | |
|---|---|---|---|---|---|
| | | Radius r | Thickness d | $n_d$ | $v_d$ |
| $L_1$ | 1 | 340.785 | 6.5 | 1.5168 | 64.2 |
| | 2 | −375.235 | 36 | | |
| $M_1$ | 3 | −120.616 | 8 | 1.5168 | 64.2 |
| | 4 | −215.820 | −8 | 1.5168 | 64.2 |
| | 5 | −120.616 | −36 | | |
| | 6 | −375.235 | −6.5 | 1.5168 | 64.2 |
| $M_2$ | 7 | 340.785 | — | 1.5168 | 64.2 |
| | 8 | −1316.482 | 4 | 1.5168 | 64.2 |
| | 9 | 340.785 | 6.5 | 1.5168 | 64.2 |
| | 10 | −375.235 | 33 | | |

-continued

| | Face No. | Radius r | Thickness d | $n_d$ | $v_d$ |
|---|---|---|---|---|---|
| | F/1.2 | f = 99.861 | s' = 6.785 | | |
| $L_2$ | 11 | 41.443 | 3 | 1.5168 | 64.2 |
| $L_3$ | 12 | −120.616 | 8 | 1.5168 | 64.2 |
| $L_4$ | 13 | −215.820 | 2 | 1.72825 | 28.4 |
| | 14 | 379.752 | | | |

EXAMPLE 2

| | Face No. | Radius r | Thickness d | $n_d$ | $v_d$ |
|---|---|---|---|---|---|
| | F/1.2 | f = 100.222 | s' = 7.782 | | |
| $L_1$ | 1 | 325.330 | 7 | 1.5168 | 64.2 |
| | 2 | −341.869 | 36 | | |
| $M_1$ | 3 | −118.844 | 8 | 1.5168 | 64.2 |
| | 4 | −220.975 | −8 | 1.5168 | 64.2 |
| | 5 | −118.844 | −36 | | |
| | 6 | −341.869 | −7 | 1.5168 | 64.2 |
| $M_2$ | 7 | 325.330 | −4 | 1.5168 | 64.2 |
| | 8 | −1252.819 | 4 | 1.5168 | 64.2 |
| | 9 | 325.330 | 7 | 1.5168 | 64.2 |
| | 10 | −341.869 | 30 | | |
| $L_2$ | 11 | 41.468 | 2 | 1.72825 | 28.4 |
| $L_3$ | 12 | 30.859 | 4 | 1.5168 | 64.2 |
| $L_4$ | 13 | −118.844 | 8 | 1.5168 | 64.2 |
| $L_5$ | 14 | −220.975 | 2 | 1.72825 | 28.4 |
| | 15 | 512.978 | | | |

EXAMPLE 3

| | Face No. | Radius r | Thickness d | $n_d$ | $v_d$ |
|---|---|---|---|---|---|
| | F/1.2 | f = 100.584 | s' = 6.480 | | |
| $L_1'$ | 1 | 340.832 | 7.5 | 1.5168 | 64.2 |
| | 2 | −389.864 | 35 | | |
| $M_1$ | 3 | −120.613 | 8 | 1.5168 | 64.2 |
| | 4 | −215.796 | −8 | 1.5168 | 64.2 |
| | 5 | −120.613 | −38 | | |
| $M_2$ | 6 | −375.235 | −8.5 | 1.5168 | 64.2 |
| | 7 | −1315.789 | 8.5 | 1.5168 | 64.2 |
| | 8 | −375.235 | 35 | | |
| $L_2$ | 9 | 44.617 | 3 | 1.5168 | 64.2 |
| $L_3$ | 10 | −120.613 | 8 | 1.5168 | 64.2 |
| $L_4$ | 11 | −215.796 | 2 | 1.72825 | 28.4 |
| | 12 | 379.795 | | | |

EXAMPLE 4

| | Face No. | Radius r | Thickness d | $n_d$ | $v_d$ |
|---|---|---|---|---|---|
| | F/1.2 | f = 99.799 | s' = 7.427 | | |
| $L_1$ | 1 | 334.001 | 6.5 | 1.5168 | 64.2 |
| | 2 | −373.972 | 35.9 | | |
| $M_1'$ | 3 | −120.207 | 8 | 1.5168 | 64.2 |
| | 4 | −214.869 | −8 | 1.5168 | 64.2 |
| | 5 | −120.207 | −35.9 | | |
| | 6 | −373.972 | −6.5 | 1.5168 | 64.2 |
| $M_2$ | 7 | 334.001 | −4 | 1.5168 | 64.2 |
| | 8 | −1310.616 | 4 | 1.5168 | 64.2 |
| | 9 | 334.001 | 6.5 | 1.5168 | 64.2 |
| | 10 | −373.972 | 32.8 | | |
| $L_2$ | 11 | 41.120 | 7.7 | 1.5168 | 64.2 |
| $L_4$ | 12 | −150.218 | 4 | 1.72825 | 28.4 |
| | 13 | 625.000 | | | |

EXAMPLE 5

| | Face No. | Radius r | Thickness d | $n_d$ | $v_d$ |
|---|---|---|---|---|---|
| | F/1.2 | f = 99.997 | s' = 7.263 | | |
| $L_1'$ | 1 | 335.570 | 7.4 | 1.5168 | 64.2 |
| | 2 | −383.730 | 34.4 | | |
| $M_1'$ | 3 | −118.737 | 7.9 | 1.5168 | 64.2 |
| | 4 | −212.450 | −7.9 | 1.5168 | 64.2 |
| | 5 | −118.737 | −37.4 | | |
| $M_2$ | 6 | −369.413 | −8.4 | 1.5168 | 64.2 |
| | 7 | −1295.337 | 8.4 | 1.5168 | 64.2 |
| | 8 | −369.413 | 35.3 | | |
| $L_2$ | 9 | 39.807 | 6.9 | 1.5168 | 64.2 |
| $L_4$ | 10 | −148.390 | 3.9 | 1.72825 | 28.4 |
| | 11 | 461.467 | | | |

All five examples each consist of a front or first single lens $L_1$, $L_1'$, a main mirror lens $M_1$, $M_1'$, a counter mirror $M_2$ in front of the front of first single lens $L_1$, $L_1'$ and a field lens system $L_2$, $L_3$, $L_4$, $L_5$.

Example 1, as shown in FIG. 1 is one objective according to the invention, that allows construction with the most simple shape. All lens elements except single field lens components are made of the same type of glass. This holds true also, for Examples 2 to 5 in order to avoid the secondary spectrum.

Figure 2:
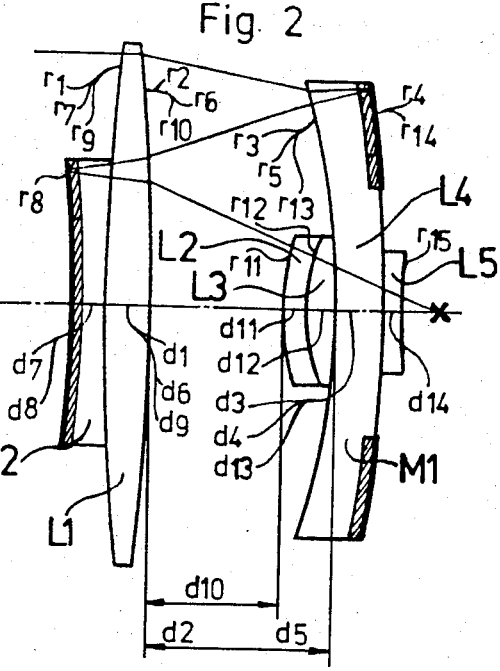

An even better chromatic correction is effected by adding one lens element to the field lens system as in Example 2, which is shown in FIG. 2.

Figure 3:
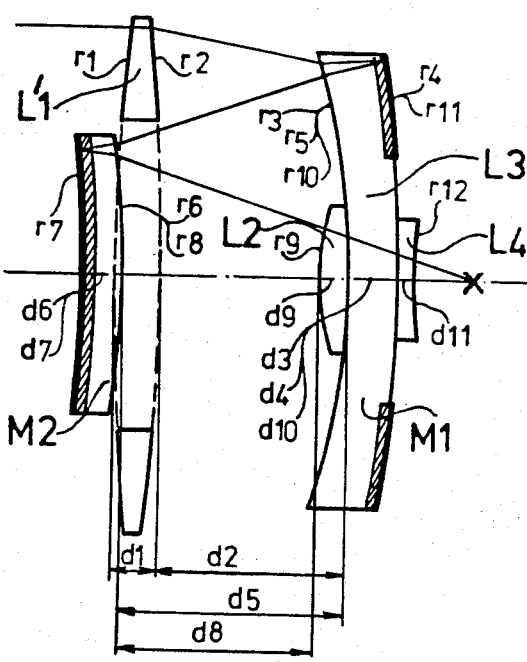
Figure 4:
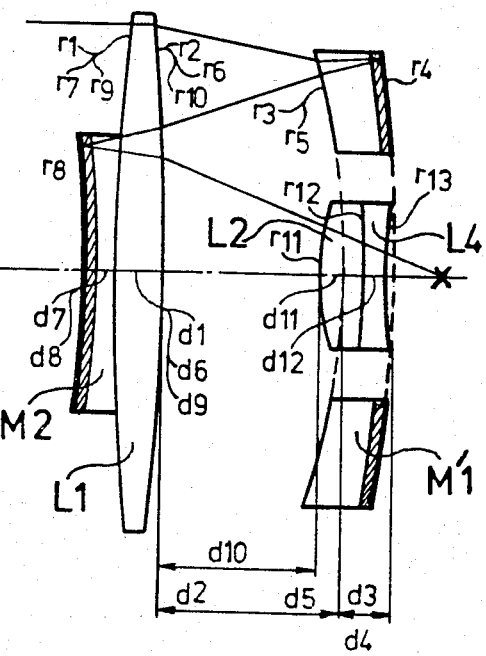

System mass may be reduced by boring out the central part of the front lens $L_1'$ as in Example 3, which is shown in FIG. 3. These and the subsequent types of lenses ease correction of image aberrations by providing additional independent correction parameters. Reduction of system mass may likewise be achieved by boring out the central part of the main mirror lens $M_1'$, as in Example 4, which is represented in FIG. 4. This allows a substantial simplification of the field lens system. The system focus as well as the field lens system may thus be arranged within the inner portion of the objective.

Figure 5:
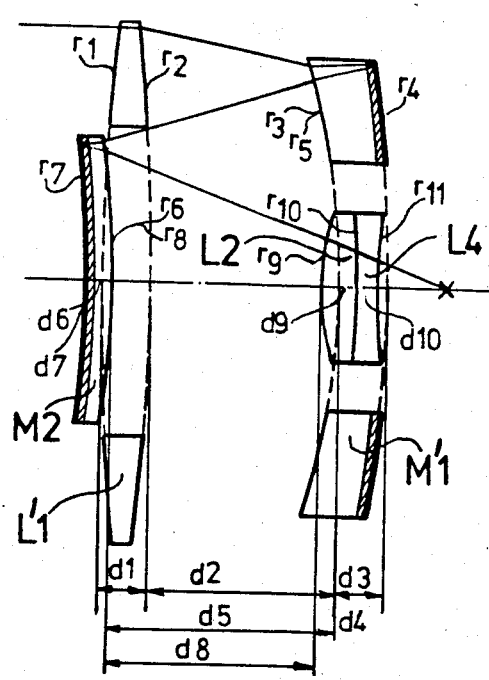

Example 5, as shown in FIG. 5 has both main optical elements $L_1'$ and $M_1'$ provided with central bores, allowing a very light construction.

Figure 6:
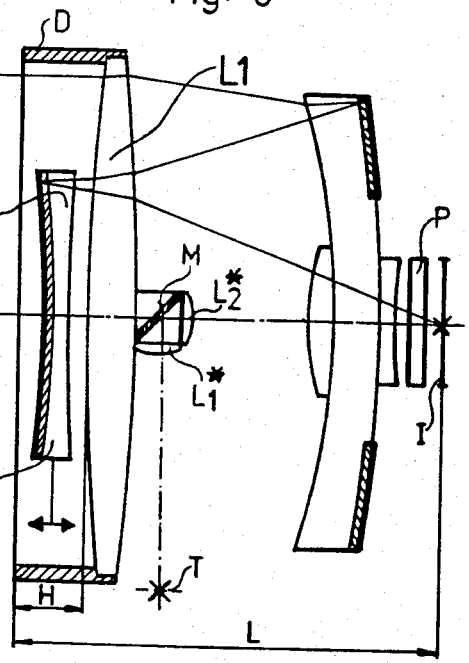
Figure 7:
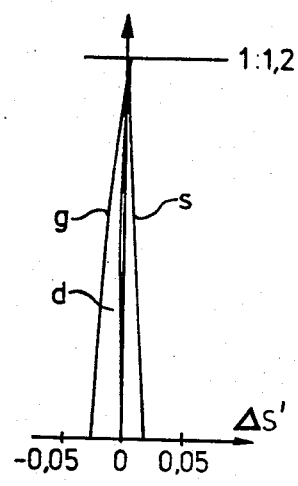
FIG. 7 shows the spherical aberration of an objective according to Example 1 of this invention for the spectral lines d ($\lambda = 588$ nm), g ($\lambda = 436$ nm) and s ($\lambda = 852$ nm)
Figure 8:
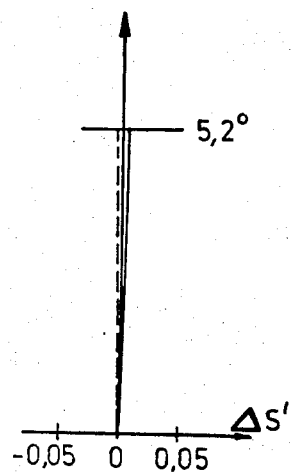
FIG. 8 shows the astigmatism of the objective according to Example 1 of the present invention.

The counter mirror may be provided as a separate element C as shown in FIG. 6. This mirror C may be shiftable with respect to the rest of the objective for various effects. e.g. for focussing purposes. The element C may also be tilted relative to the optical system axis, it may be shifted along or transversal to that axis and a change in relative position may also be accomplished by a combination of these motions.

Focussing with the counter mirror C on a near object is of particular advantage in cases where a reticle or aiming mark T is projected on the image plane I of the objective by means of a lens system $L_1^*$, $L_2^*$ and a mirror M. Thus, the distance TI remains constant during focussing operations without effect on magnification and sharpness of the image of reticle T. Focussing by counter mirror C has still another advantage, when the inner part of the system must be kept completely sealed.

If the field lens system $L_2$, $L_4$ is provided as a separate unit as shown in FIGS. 4 and 5, its position within the rest of the system may be changed in the same way as described above for the counter mirror.

The counter mirror $M_2$ may also, of course, be a surface mirror, in contrast to the mirror lens $M_2$ shown in FIGS. 1 to 6, without departing from the scope and teachings of the invention. Other modifications of the objectives according to the present invention are well suited for use with image intensifier tubes, particularly those of the $3^{rd}$ generation, which are provided with a glass plate P in front of the image plane I as shown in FIG. 6.

Other modifications of the present invention are systems made of material suited for use within the ultraviolet or infrared spectral ranges (including the so-called heat image generation). As known in the art such material usually has refraction numbers different from those of glasses for the visual range, thus the person skilled in the art will have to conduct adaptive calculations known as such to obtain other lens data that may differ substantially from those given in Examples 1 to 5.

It has been found that mirror lens objectives according to the present invention can be realized with a comparatively short length but at the same time with a high aperture ratio, as well as an excellent image quality over a broad spectral range.

Table 1 gives a comparison between examples of the present invention and of the state of the art. All systems are based on a common focal length $f=100$. Evidently, sphero-chromatism of the examples according to the present invention is about the same as that of the best state-of-the-art system. But this known system has a distance $d_2$ between front lens and main mirror lens that exceeds $d_2$ according to the present invention by about 50%, and to the ratio of overall lengths is even greater if a required sunshade D (see FIG. 6) is taken into consideration.

TABLE 1

| $f = 100$ | Example No. | Distance $d_2$ | Sphero-chromatism $\Delta s_{gd}'$ for F/1.2 |
|---|---|---|---|
| U.S. Pat. Application Ser. No. 967,973 now U.S. Pat. No. 4,273,425 | 1 | 46.9 | 0.038 |
| | 2 | 47.1 | 0.038 |
| | 3 | 53.7 | 0.021 |
| | 4 | 46.7 | 0.042 |
| U.S. Pat. Application Ser. No. 280,244 now U.S. Pat. No. 4,398,809 | 1 | 43 | 0.045 |
| | 2 | 43 | 0.046 |
| | 3 | 43 | 0.042 |
| Present Application | 1 | 36 | 0.022 |
| | 2 | 36 | 0.024 |
| | 3 | 35 | 0.022 |
| | 4 | 36 | 0.024 |
| | 5 | 34.4 | 0.026 |

If the length H of a sunshade D (see FIG. 6) is added to the overall length of the objective, the distance L from the outer rim of sunshade D to the location of the image I of all the known examples of Table 1 exceeds L according to the present invention by at least 55%, other characteristics, e.g. visual field, central obstruction, being equal on both sides. Consideration of FIGS. 1-6 may lead to the conclusion, that location of counter mirror $M_2$ in front of the front lens $L_1$, $L_1'$ would increase the overall system length by at least the thickness of the counter mirror lens $M_2$. But this is not so, as the required sunshade for the disclosed systems protrudes past the counter mirror. Also, attachment of a field lens $L_4$, $L_5$ behind the main mirror lens $M_1$ does not prolong the space required by the lens system, as, in general, the back focal distance may be shortened by the thickness of this lens $L_4$, $L_5$.

For most applications, the image quality of Examples 1 to 5 of the present invention allows for an increase of the specified aperture ratio of F/1.2, and the focal distance of $f=100$ without perceptibly impairing performance.

As glasses of low price, which are light and have a good suitability for production (e.g. BK 7 type) may be used for objectives according to the present invention with a rather simple optical structure, light and very handy systems of low production cost are available. One area for suitable application is optoelectronics, where high contrast imaging for good detectability of low contrast objects is of paramount importance. Generally, these objectives are suitable for all applications with maximum requirements of speed and image quality.

As may be seen from L. Čanžek: "Bildfehler dritter Ordnung von klassischen Spiegelobjektiven mit sphärischen Flächen", Optik 57, 1980, for reduction of image errors of catadioptric objectives the distance between main mirror and counter mirror must be made as large as possible. This object, among others, has been achieved, according to the invention, with a concurrent reduction of overall length, by placing the counter mirror in front of the front lens.

This rather simple method is indicated nowhere within the broad relevant literature on the state-of-the-art of catadioptric objectives. Known solutions, on the contrary, have resulted by proceeding in the contrary direction, namely by silvering the counter mirror on the front lens itself or by placing it at the interior of the lens system.

It will be appreciated that various modifications and changes of the preferred embodiments, some of which have been described above, may be made without leaving the scope of this invention as defined in the accompanying claims. ACCORDINGLY,

What I claim is:

1. A high speed objective system lens with a first single lens (L1), a main mirror lens (M1), a counter mirror lens (M2) and a field lens system composed of an unsilvered central portion (L3) of the main mirror lens (M1) and lenses (L2, L4), wherein the elements of the system referred to have the following numerical values:

| | Face No. | F/1.2 f= 99.861 s' = 6.785 | | | |
|---|---|---|---|---|---|
| | | Radius r | Thickness d | $n_d$ | $v_d$ |
| L1 | 1 | 340.785 | 6.5 | 1.5168 | 64.2 |
| | 2 | −375.235 | 36 | | |
| M1 | 3 | −120.616 | 8 | 1.5168 | 64.2 |
| | 4 | −215.820 | −8 | 1.5168 | 64.2 |
| | 5 | −120.616 | −36 | | |
| | 6 | −375.235 | −6.5 | 1.5168 | 64.2 |
| M2 | 7 | 340.785 | — | 1.5168 | 64.2 |
| | 8 | −1316.482 | 4 | 1.5168 | 64.2 |
| | 9 | 340.785 | 6.5 | 1.5168 | 64.2 |
| | 10 | −375.235 | 33 | | |
| L2 | 11 | 41.443 | 3 | 1.5168 | 64.2 |
| L3 | 12 | −120.616 | 8 | 1.5168 | 64.2 |
| L4 | 13 | −215.820 | 2 | 1.72825 | 28.4 |
| | 14 | 379.752 | | | | where F is the speed of the system, f is the focal length of the system, s' is the back focal distance, $L_3$ is the central portion of the main mirror $M_1$, $n_d$ is the refractive index and $v_d$ is Abbe's number.

2. A high speed objective system lens with a first single lens (L1), a main mirror lens (M1), a counter mirror lens (M2) and a field lens system composed of an unsilvered central portion (L4) of the main mirror lens (M1) and lenses (L2, L3, L5), wherein the elements of the system referred to have the following numerical values:

| F/1.2 Face No. | | f = 100.222 Radius r | Thickness d | s' = 7.782 $n_d$ | $v_d$ |
|---|---|---|---|---|---|
| $L_1$ | 1 | 325.330 | 7 | 1.5168 | 64.2 |
|  | 2 | −341.869 | 36 |  |  |
| $M_1$ | 3 | −118.844 | 8 | 1.5168 | 64.2 |
|  | 4 | −220.975 | −8 | 1.5168 | 64.2 |
|  | 5 | −118.844 | −36 |  |  |
|  | 6 | −341.869 | −7 | 1.5168 | 64.2 |
| $M_2$ | 7 | 325.330 | −4 | 1.5168 | 64.2 |
|  | 8 | −1252.819 | 4 | 1.5168 | 64.2 |
|  | 9 | 325.330 | 7 | 1.5168 | 64.2 |
|  | 10 | −341.869 | 30 |  |  |
| $L_2$ | 11 | 41.468 | 2 | 1.72825 | 28.4 |
| $L_3$ | 12 | 30.859 | 4 | 1.5168 | 64.2 |
| $L_4$ | 13 | −118.844 | 8 | 1.5168 | 64.2 |
| $L_5$ | 14 | −220.975 | 2 | 1.72825 | 28.4 |
|  | 15 | 512.978 |  |  |  | where F is the speed of the system, f is the focal length of the system, s' is the back focal distance, $L_4$ is the central portion of the main mirror $M_1$, $n_d$ is the refractive index and $v_d$ is Abbe's number.

3. A high speed objective system lens with a first single lens (L'1), a main mirror lens (M1), a counter mirror lens (M2) and a field lens system composed of an unsilvered central portion (L3) of the main mirror lens (M1) and lenses (L2, L4), wherein the elements of the system referred to have the following numerical values:

| F/1.2 Face No. | | f = 100.584 Radius r | Thickness d | s' = 6.480 $n_d$ | $v_d$ |
|---|---|---|---|---|---|
| $L_1'$ | 1 | 340.832 | 7.5 | 1.5168 | 64.2 |
|  | 2 | −389.864 | 35 |  |  |
| $M_1$ | 3 | −120.613 | 8 | 1.5168 | 64.2 |
|  | 4 | −215.796 | −8 | 1.5168 | 64.2 |
|  | 5 | −120.613 | −38 |  |  |
| $M_2$ | 6 | −375.235 | −8.5 | 1.5168 | 64.2 |
|  | 7 | −1315.789 | 8.5 | 1.5168 | 64.2 |
|  | 8 | −375.235 | 35 |  |  |
| $L_2$ | 9 | 44.617 | 3 | 1.5168 | 64.2 |
| $L_3$ | 10 | −120.613 | 8 | 1.5168 | 64.2 |
| $L_4$ | 11 | −215.796 | 2 | 1.72825 | 28.4 |
|  | 12 | 379.795 |  |  |  | where F is the speed of the system, f is the focal length of the system, s' is the back focal distance, $L_3$ is the central portion of the main mirror $M_1$, $n_d$ is the refractive index and $v_d$ is Abbe's number.

4. A high speed objective system lens with a first single lens (L1), a main mirror lens (M'1), a counter mirror lens (M2) and a field lens system composed of lenses (L2, L4), wherein the elements of the system referred to have the following numerical values:

| F/1.2 Face No. | | f = 99.799 Radius r | Thickness d | s = 7.427 $n_d$ | $v_d$ |
|---|---|---|---|---|---|
| $L_1$ | 1 | 334.001 | 65 | 1.5168 | 64.2 |
|  | 2 | −373.972 | 35.9 |  |  |
| $M_1'$ | 3 | −120.207 | 8 | 1.5168 | 64.2 |
|  | 4 | −214.869 | −8 | 1.5168 | 64.2 |
|  | 5 | −120.207 | −35.9 |  |  |
|  | 6 | −373.972 | −6.5 | 1.5168 | 64.2 |
| $M_2$ | 7 | 334.001 | −4 | 1.5168 | 64.2 |
|  | 8 | −1310.616 | 4 | 1.5168 | 64.2 |
|  | 9 | 334.001 | 6.5 | 1.5168 | 64.2 |
|  | 10 | −373.972 | 32.8 |  |  |
| $L_2$ | 11 | 41.130 | 7.7 | 1.5168 | 64.2 |
| $L_4$ | 12 | −150.218 | 4 | 1.72825 | 28.4 |
|  | 13 | 625.000 |  |  |  | where F is the speed of the system, f is the focal length of the system, s' is the back focal distance, $n_d$ is the refractive index and $v_d$ is Abbe's number.

5. A high speed objective system lens with a first single lens (L'1), a main mirror lens (M'1), a counter mirror lens (M2) and a field lens system composed of lenses (L2, L4), wherein the elements of the system referred to have the following numerical values:

| F/1.2 Face No. | | f = 99.997 Radius r | Thickness d | s' = 7.263 $n_d$ | $v_d$ |
|---|---|---|---|---|---|
| $L_1'$ | 1 | 335.570 | 7.4 | 1.5168 | 64.2 |
|  | 2 | −383.730 | 34.4 |  |  |
| $M_1'$ | 3 | −118.737 | 7.9 | 1.5168 | 64.2 |
|  | 4 | −212.450 | −7.9 | 1.5168 | 64.2 |
|  | 5 | −118.737 | −37.4 |  |  |
| $M_2$ | 6 | −369.413 | −8.4 | 1.5168 | 64.2 |
|  | 7 | −1295.337 | 8.4 | 1.5168 | 64.2 |
|  | 8 | −369.413 | 35.3 |  |  |
| $L_2$ | 9 | 39.807 | 6.9 | 1.5168 | 64.2 |
| $L_4$ | 10 | −148.390 | 3.9 | 1.72825 | 28.4 |
|  | 11 | 461.467 |  |  |  | where F is the speed of the system, f is the focal length of the system, s' is the back focal distance, $n_d$ is the refractive index and $v_d$ is Abbe's number.

* * * * *